(No Model.)
A. WEHRLE.
PROCESS OF TREATING WINES.
No. 343,973. Patented June 15, 1886.
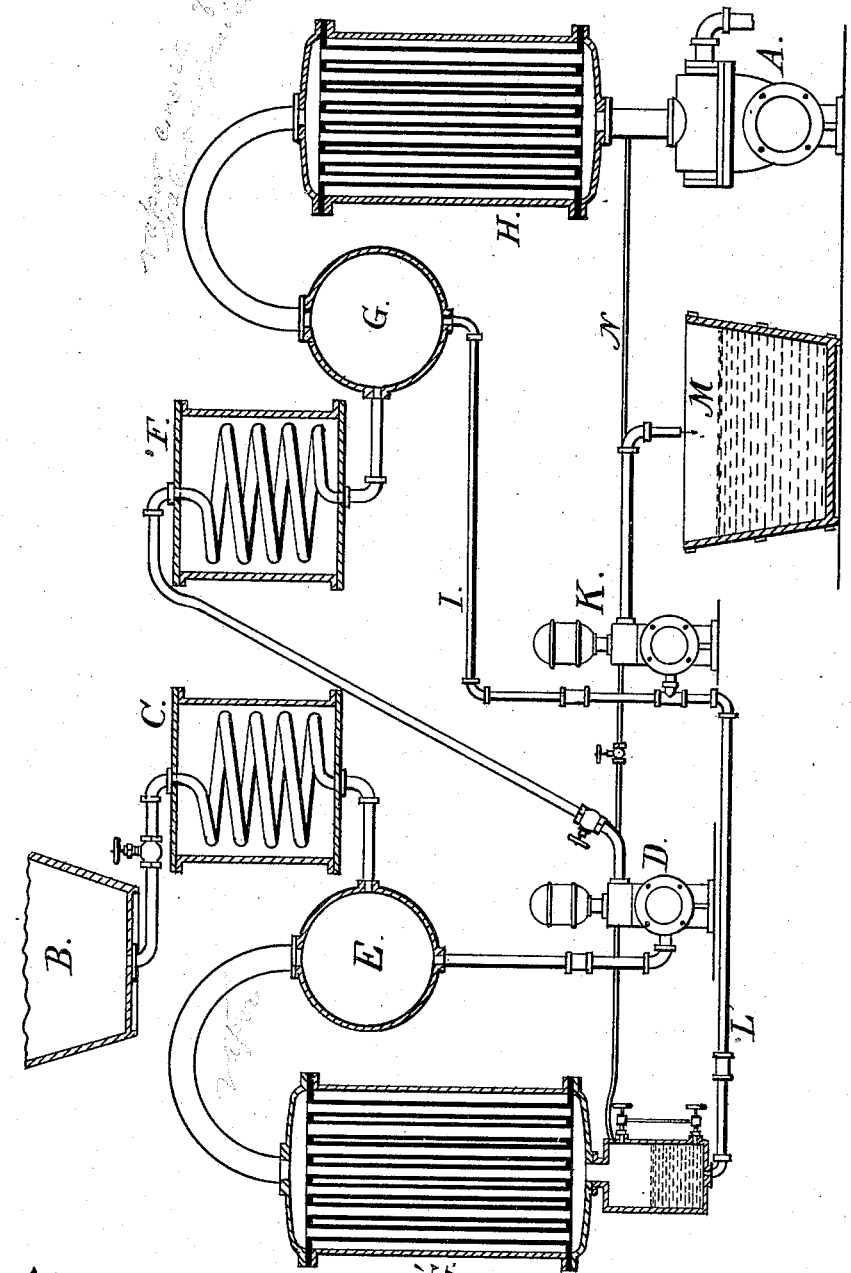
ATTEST:
INVENTOR:
Andrew Wehrle

UNITED STATES PATENT OFFICE.

ANDREW WEHRLE, OF MIDDLE BASS ISLAND, OHIO.

PROCESS OF TREATING WINE.

SPECIFICATION forming part of Letters Patent No. 343,973, dated June 15, 1886.

Application filed March 6, 1886. Serial No. 194,331. (No model.)

*To all whom it may concern:*

Be it known that I, ANDREW WEHRLE, of Middle Bass Island, Ottawa county, Ohio, have invented a new and useful Improvement in the Process of Treating Wines, by means of an addition and improvement on the apparatus of Homer T. Yaryan, of Toledo, Ohio, (for which latter Letters Patent have been granted by the proper department of the United States of America to said Homer T. Yaryan,) of which the following is a specification.

My invention consists in removing a portion of the water by a continuous process and at such low temperature as not to impair the flavor or injure the quality of the wine, as hereinafter described.

The method now in general use for the production and manufacture of sweet wines—sweet catawba, sherry, and port—consists in the addition to the dry wines of sugar and spirits, by means of the latter of which a further fermentation is prevented; but this method is open to the serious objection that the presence of the alcohol is very apparent and is distasteful to the consumer. Now, to overcome these objections and produce a wine which for keeping qualities and palatableness is equal to any imported wines is the purpose of my invention, and which may be described as follows:

I use an apparatus shown in the accompanying drawing, which represents a vertical section of the apparatus, which consists of a double coil with two separating-chambers, force and suction pumps for handling the wine, vacuum-pump to produce vacuum, and condensers.

The operation is as follows: A vacuum is produced within the apparatus by working the vacuum-pump A. When about twenty-six inches of vacuum is produced, the feed of wine is admitted to the feed-box B, and is at once drawn within the first coil, C, in a continuous stream. The tail-pipe pump D is now started, which draws the wine from the separating-chamber E, and forces it to the inlet of second coil, F, through which it passes to the separating-chamber G, from which it is discharged by pipe I and pump K into the tub or other receptacle M. When the wine has been started into the first coil, steam is admitted to the steam-chest containing the coil and causes the wine flowing through the coil to boil at a temperature corresponding with the vacuum. As alcohol boils at a lower temperature than water, the first vapor given off from the boiling wine will be largely alcoholic, and as the feed of wine to the coil is about double the quantity which this coil is capable of evaporating it is quite evident that about one-half the wine passing through will be volatilized, and the vapor will contain practically all the alcohol when the percentage originally does not exceed fifteen per cent. This vapor passes through the vapor-pipe to the condenser G', where it is condensed to a liquid containing all the alcohol. The residual liquid passing through separator E is forced by pump D to the second coil in steam-box F, where it is again boiled, and the vapor, which consists of water and volatile impurities, passes through the vapor-pipe to second condenser, H, from which it is discharged by vacuum-pump A. The concentrated liquid from the second coil, containing all the salts, tannin, sugar, and solid matters, is drawn through the tail-pipe I by the pump K, and there meets and mixes with the alcoholic distillate from the condenser G' through the pipe L'.

N represents an equalizing-pipe connecting condenser G' with condenser H and vacuum-pump A.

In actual practice by operating on more than twenty thousand gallons of catawba and port wines, I have found the results claimed in this application to have been fully realized; that, although the temperature of steam-chests C and F was 212° Fahrenheit, the wine in passing through the coils was not heated to a higher degree than 135° Fahrenheit, at which temperature it boils under twenty-five inches of vacuum.

It is quite evident from this description that the wine discharged by the pump K will contain all the original elements, except the water discharged by the vacuum-pump.

What I claim as new, and desire to obtain Letters Patent for, is—

The process which consists in eliminating a portion of the water from wine, by double distillation in vacuums, in such manner that the condensed vapor containing the alcohol shall mix continuously with residual product after the second vaporization.

In testimony whereof I have hereunto set my hand in the presence of two subscribing witnesses.

ANDREW WEHRLE.

Witnesses:
W. W. WOODWARD,
FRANK P. COLVER.